(12) United States Patent
Stein et al.

(10) Patent No.: US 8,107,058 B2
(45) Date of Patent: Jan. 31, 2012

(54) SENSOR DEVICE AND SYSTEM HAVING A CONVEYOR AND A SENSOR DEVICE

(75) Inventors: Manfred Stein, Domat (CH); Carl Meinherz, Malans (CH); Bas Albers, Chur (CH)

(73) Assignee: Cedes AG, Landquart (CH)

( * ) Notice: Subject to any disclaimer, the term of this patent is extended or adjusted under 35 U.S.C. 154(b) by 151 days.

(21) Appl. No.: 12/548,892

(22) Filed: Aug. 27, 2009

(65) Prior Publication Data

US 2009/0316135 A1 Dec. 24, 2009

Related U.S. Application Data

(63) Continuation of application No. PCT/EP2008/001166, filed on Feb. 15, 2008.

(30) Foreign Application Priority Data

Mar. 6, 2007 (DE) .......................... 10 2007 011 221
Mar. 16, 2007 (DE) .......................... 10 2007 013 299

(51) Int. Cl.
*G01P 3/36* (2006.01)
(52) U.S. Cl. ........................................................ 356/27
(58) Field of Classification Search ........................ None
See application file for complete search history.

(56) References Cited

U.S. PATENT DOCUMENTS

| | | | |
|---|---|---|---|
| 5,903,355 A | 5/1999 | Schwarz | |
| 5,915,332 A | 6/1999 | Young et al. | |
| 6,778,092 B2 | 8/2004 | Braune | |
| 2003/0076224 A1 * | 4/2003 | Braune | 340/500 |
| 2005/0207619 A1 | 9/2005 | Lohmann | |
| 2006/0049340 A1 | 3/2006 | Haberer et al. | |
| 2006/0114323 A1 | 6/2006 | Grimm et al. | |
| 2008/0021597 A1 | 1/2008 | Merte et al. | |

FOREIGN PATENT DOCUMENTS

| | | |
|---|---|---|
| DE | 43 06 719 A1 | 9/1993 |
| DE | 44 11 448 A1 | 10/1995 |
| DE | 100 55 689 A1 | 5/2002 |
| DE | 101 52 543 A1 | 5/2003 |
| DE | 103 20 343 A1 | 12/2004 |
| DE | 10 2004 020 998 A1 | 11/2005 |
| DE | 10 2004 041 821 A1 | 3/2006 |
| DE | 10 2004 043 515 A1 | 3/2006 |
| DE | 10 2004 049 482 A1 | 4/2006 |
| DE | 10 2005 003 794 A1 | 8/2006 |
| DE | 10 2006 010 990 A1 | 9/2006 |
| DE | 10 2005 030 829 A1 | 1/2007 |
| EP | 1 544 535 A1 | 6/2005 |
| EP | 1 662 349 A1 | 5/2006 |
| WO | 2007/071032 A1 | 6/2007 |
| WO | 2007/085704 A1 | 8/2007 |

* cited by examiner

*Primary Examiner* — Tu Nguyen

(74) *Attorney, Agent, or Firm* — Boyle Fredrickson, S.C.; William R. Walbrun; John M. Miller

(57) ABSTRACT

A sensor device having a sensor arrangement for detecting moving objects that includes a sensor and an electronic unit. The sensor arrangement is designed to detect an object and to subsequently investigate whether there are present within the surface of the object regions that move at a different speed and/or acceleration. The sensor arrangement can also investigate whether the object is accelerating.

23 Claims, 2 Drawing Sheets

SENSOR DEVICE AND SYSTEM HAVING A CONVEYOR AND A SENSOR DEVICE

CROSS REFERENCE TO RELATED APPLICATIONS

This application is a continuation of International Application No. PCT/EP2008/001166, filed Feb. 15, 2008, which designated the United States, and claims the benefit under 35 USC §119(a)-(d) of German Application Nos. 10 2007 011 221.3 filed Mar. 6, 2007 and 10 2007 013 299.0 filed Mar. 16, 2007, the entireties of which are incorporated herein by reference.

FIELD OF THE INVENTION

The invention relates to a sensor device comprising sensor means and an electronic unit for detecting moving objects, a system having a conveyor for transporting objects, and a sensor device.

BACKGROUND OF THE INVENTION

Industrial production devices frequently comprise robots or machines that are supplied automatically with the material to be processed via a conveyor. Such robots or machines regularly constitute a danger area that is to be monitored with the aid of safety devices. In this case, it is usually necessary for the safety device to be capable of distinguishing the material inflow to the robot or to the machine from persons whose approach to the robot or the machine is not permitted.

There are many solutions in the prior art where reference objects and reference scenes are stored and it is possible during the operation to establish any difference of a current scene from a reference. Some solutions store reference objects whose approach to a danger area is permitted. By contrast, others store the reference objects or scenes that can lead to a dangerous situation and consequently require a specific reaction of the machine or the robot.

German Laid Open Patent Application No. 44 11 448 A1 discloses a three-dimensional measuring device with the aid of which it is possible to detect a contour function of an object and compare it with a stored reference contour. A prescribed reaction of the system can be instituted as a function of how the measured contour matches or does not match a stored contour.

The determination of a contour and its matching with a reference contour can never be carried out completely, since every new object requires detection of a reference contour in a learning process.

SUMMARY OF THE INVENTION

The invention is based on the object of configuring the monitoring of prescribed, in particular dangerous areas with regard to people, for example, to be comparatively easier.

The invention firstly proceeds from a sensor device having a sensor arrangement for detecting moving objects that comprises sensor means and an electronic unit. The core of the invention resides in the fact that the sensor arrangement is designed to detect an object and to subsequently investigate whether there are present within the surface of the object regions that move at different speeds.

This mode of procedure is based on the finding that objects and living beings, in particular people, have characteristic movement patterns. Objects normally move with reference to their surface with a homogeneous speed or acceleration, independently of whether they are being transported with the aid of a conveyor or are moving automatically. By contrast, people cannot move without surface regions of the person having different speeds and accelerations. For example, one leg of a person moves, whereas the other will be standing on a substratum. This difference in speeds or accelerations of the object surface can be determined and used to distinguish an object from a person and/or an animal in a comparatively simple way. On the other hand, the detection of an acceleration of the object can already be sufficient to assign such a detection to a person. The point is that objects transported on a conveyor do not normally accelerate as they approach. As soon as an acceleration is detected, for example by a temporal comparison of images of the object, a signal can be output. The known possibilities can also be combined in order to be able to undertake a differentiation of objects.

In another embodiment of the invention, the sensor arrangement is designed to output a signal, in particular an alarm signal in the event of the detection of various speeds and/or accelerations for different regions within a surface of an object when the speeds or accelerations differ by a predetermined amount. A further criterion can be taken as the size of the region having a different speed or acceleration with reference to the object surface visible to the sensor means. For example, a region that has another speed or acceleration must constitute in relation to the remaining object surface a minimum proportion of the object surface visible to the sensor means. It is conceivable to fix the size of the region to greater than 5%, in particular greater than 10%.

It is preferred, furthermore, when the sensor arrangement is designed to determine an image of the object with distances from the object surface, that is to say a "distance map". If a plurality of such images are acquired one after another, it is possible to use the difference in the images, that is to say the distances, to determine a speed or acceleration by relating the individual differences to the running time. A speed map or acceleration map of the relevant object surface can be determined therefrom. It is easy to determine from these data regions on the object that have another speed or acceleration by comparison with other regions of the object. If the difference in speed or acceleration exceeds a prescribed measure, it is possible to infer the movement of a living being, in particular a person.

In order to determine a speed image or acceleration image, it is preferred to use a prescribed number of distance images that are recorded one after another in time in such a way that a new image always replaces the oldest image of the prescribed group, in order to determine therefrom the speed or the acceleration of individual pixels, in particular. A current speed or acceleration is thereby determined in a progressive iteration.

Three images 1, 2 and 3 are used by way of example to calculate the speed. A fourth image is used for the next step, but the first image is no longer taken into account for the renewed calculation of the speeds, but rather then the images 2, 3 and 4.

In another embodiment, the sensor means comprise a single monitoring sensor, for example a 3D camera. Different technologies can be used to determine a 3D image. For example, a three-dimensional image of an object is determined by triangulation on the basis of two single stereo cameras. Moreover, radar sensors or sensors that are based on interferometry can be used. It is likewise conceivable to use a sensor that determines a distance from a point from the propagation time or phase shift of a signal. For example, a sensor can be used in the case of which an electromagnetic wave of specific frequency is modulated onto a signal, it being possible to determine a distance from the object from the phase difference of the emitted modulated signal in relation to the signal retroreflected by an object. This technology can also be applied in a matrix camera such that a "distance image" of an object can be produced.

In another embodiment of the invention, use is made of a light curtain having a plurality of transmitters and receivers that extends in the movement direction. An acceleration of an object can thereby be acquired.

In order, for example, to avoid the possibility of persons nevertheless reaching a danger area unobserved, because they are covered by an article that is likewise approaching, it is possible to use monitoring sensors, for example a plurality of 3D cameras.

By way of example, two 3D cameras are arranged such that they have an overlapping observation area. In this case, the 3D cameras are preferably arranged opposite with reference to a region to be monitored. It is possible thereby, by way of example, to acquire the front side and the rear side, but also the lateral regions of an article such that a person approaching without authorization is not shaded by this article in such a way as no longer to be acquired.

It is likewise possible to operate at different times. In particular, the monitoring sensors, for example cameras, are synchronized with one another in such a way that each camera is active in a predetermined "time window". Mutual disturbances between the sensors can thereby be avoided. A mutual influence can also be circumvented by having the sensors operate at different frequencies. In the case of a 3D sensor that evaluates a phase shift of modulated light, different frequencies can be related to a carrier frequency or a modulation frequency.

In order to prevent a person who is moving very slowly from reaching the danger area, the detection of a slow movement is preferably assigned to a person detection.

In another embodiment of the invention, correction means are provided in order to be able at least approximately to compensate speed differences and/or acceleration differences of points in a plane at an object surface that moves in a normally occurring preferred direction relative to the sensor means. This mode of procedure is a basis for the fact that a plane that is moving toward a camera does not have the same speed and/or acceleration at all locations. A point lying on the optical axis of the camera system moves more quickly toward the camera than a point that is at a distance from the optical axis. This dependence is preferably compensated. To this end, a learning mode may be applied in order to establish the transport direction and the speed of a conveyor. The transport direction can serve to define a Cartesian coordinate system that lies exactly in the transport direction. All recorded images can then be transformed into this coordinate system, something which simplifies the calculation of the speed or the acceleration of object surfaces when the system is in the regular observation mode. It is possible in this way also to compensate the detection of an acceleration of points on an object that is actually moving constantly for points that are at a distance at right angles from the optical axis of the sensor means and therefore have another acceleration than that in the optical axis.

It is preferred, furthermore, when the sensor arrangement is designed in such a way that it is possible to qualify regions having a different speed and/or acceleration on an object surface with reference to known speed patterns and acceleration patterns, respectively. It is thereby possible in principle, for example, to essentially identify objects and thus distinguish people from dogs that, if appropriate, are not permitted to enter a region in contradistinction to people.

In order, for example, to be able to detect a person sitting still on a pallet who is approaching a danger area by a conveying device, it is advantageous when the sensor arrangement is capable of detecting objects, by way of example with the aid of contours, for example by means of curved lines. In this case, however, this is codirected only in the case when otherwise approaching objects have no curved lines.

In conjunction with a conveyor, it is preferred, besides, when the conveyor moves nonuniformly. A person otherwise standing still on the conveyor is thereby forced to carry out compensation movements, the result being, once again, surface patterns having different speeds that can be assigned according to the invention to animals or a person.

In another embodiment of the invention, the sensor arrangement is capable of detecting speed patterns and/or acceleration patterns with the aid of one or more learning runs. The sensor arrangement can have recourse to these patterns in order to undertake a comparison with a current speed or acceleration pattern. By way of example, it is thereby possible to distinguish a person from an animal.

The point is that an animal is known from experience to deliver a different pattern than a person.

Furthermore, it is preferred for the sensor arrangement to be capable of hiding one or more prescribable subregions of the detection region in order to output a signal. For example, only specific "volume regions" are considered in three-dimensionally acquired space as a function of a speed or an acceleration of an object.

In another embodiment of the invention, the signal output is dependent on which position, which distance from the camera, which movement direction, which speed and/or which acceleration objects have. For example, it is possible to dispense with a signal output in the case of a large distance of an object or of a small distance of the object, and of comparatively low speed of the object.

An inventive sensor device can be applied in relation to a danger area not only in the context of a conveyor system. It will also be possible to control the access to a door or a gate to the effect that only objects having a prescribed acceleration and/or speed pattern are given access to a specific space or, in general, that the approach or passage of a person is established. It is possible thereby to control a door movement in a way that the door does not close when the sensor device establishes there are persons in the closing region of the door.

BRIEF DESCRIPTION OF THE DRAWINGS

A plurality of exemplary embodiments of the invention are illustrated in the drawings and explained in more detail below with indication of further advantages and details.

DETAILED DESCRIPTION OF THE INVENTION

Figure 1:
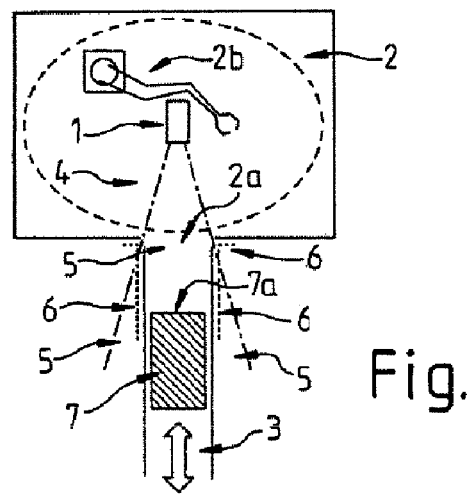
FIG. 1 shows a robot cell with a conveying device for bringing up articles, in a schematic plan view.

FIG. 1 shows a robot cell 2 in front of which there is arranged a conveyor belt 3 for supplying it with articles 7. The robot cell 2 has an access area 2a that people may not pass as long as a robot 2b is active.

FIG. 1 illustrates a situation in which an article 7 is being transported on the conveyor belt 3 in a danger area 4 of the robot 2b over the access area 2a. A 3D camera 1 determines the speed of the article 7. The 3D camera 1 comprises, for example, an optical sensor which determines the distance from an object optically by using the "time of flight" or, for short, "TOF" method. In this case, light is emitted from a light source onto which an oscillation is modulated. Moreover, a sensor is provided with the aid of which the modulated light can be acquired when it is retroreflected by a corresponding surface. The distance from the object at which the light was retroreflected can be determined from the phase difference of the oscillation modulated on between the emitted and the received reflected light. In order to enable a unique evaluation, the wavelength of the oscillation modulated onto the light should be greater than twice the distance from the object at which the light is retroreflected. It is preferred to use a sensor with a large number of pixels, in particular a matrix sensor, that can produce a "distance image map" of the article 7. If a plurality of consecutively recorded distance images are compared with one another and divided by the time, the speed of the approaching article 7 can be determined with a resolution that permits the detection of differences in speed within the surface of the article 7.

Since, however, the article 7 has a speed distribution of its surface 7a that is acquired by the 3D camera 1 and is substantially homogeneous in accordance with a solid article, the article 7 is permitted to move into the danger area 4. In this case, the robot 2b in the robot cell 2 continues to operate.

Provided in front of the access area 2a, the mechanical safety devices 6 that are used to prevent people from entering the danger area 4 without the camera 1 being capable of perceiving this.

Figure 2:
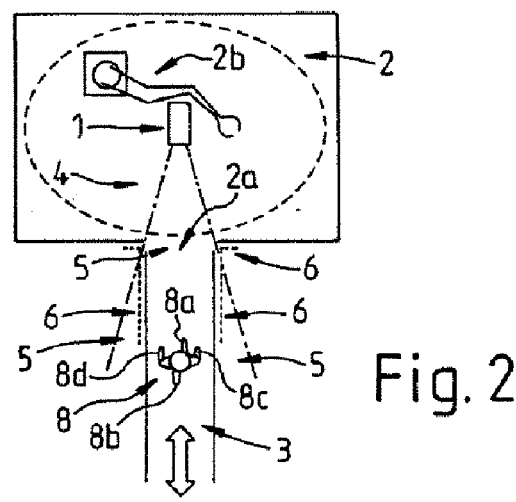
FIG. 2 shows a robot cell, corresponding to FIG. 1, with a conveying device in the case of which a person instead of an article moves toward the robot cell.

FIG. 2 shows a situation in which a person 8 is attempting to enter the danger area 4. With reference to the trunk, the 3D camera 1 detects different speeds of legs 8a, 8b and arms 8c, 8d when the person 8 walks up.

The robot 2b is prompted to cease dangerous actions on the basis of the inhomogeneous speed distribution by means of an appropriate controller (not shown in the drawings).

The field of view of the respective single camera 1 in FIGS. 1 and 2 is provided with the reference symbol 5.

Two cameras 1', 1" are preferred when it is possible that a person 8 may be hidden behind or in front of the article 7, and access to the danger area 4 is possible in this way. The two cameras 1', 1" are advantageously installed in such a way that the complete surface 7a of the article 7 can be monitored. Every hidden person 8 who moves at the side of the article 7 is therefore detected.

Figure 3:
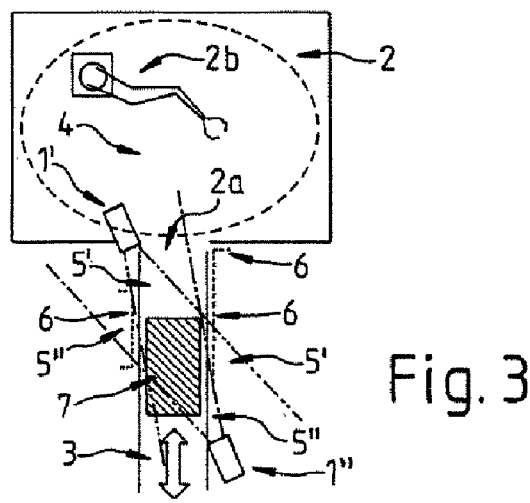
FIG. 3 shows in a schematic plan view a robot cell with a conveying device that is monitored by two cameras instead of one.

FIG. 3 shows a situation in which only an article 7 enters the danger area 4, there being no person. With the robot running, the article 7 is not prevented from moving into the danger area 4.

Figure 4:
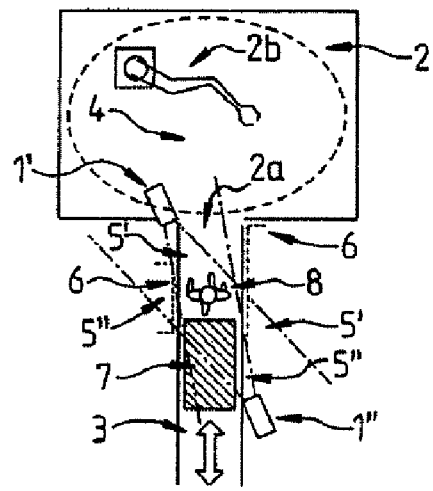
FIGS. 4 and 5 show the embodiment according to FIG. 3 in different operating states, likewise respectively in plan view.
Figure 5:
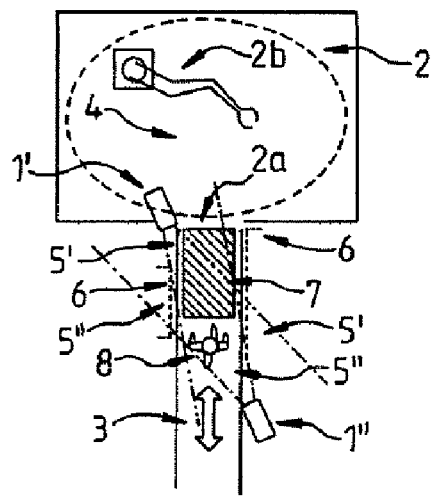

By contrast, FIGS. 4 and 5 illustrate a situation in which a person 8 is located in front of or behind the article 7 and wishes to enter the danger area 4 in this way. However, at least respectively one camera 1', 1" is capable of seeing the person 8 and appropriately identifying the same, and so appropriate measures may be instituted in the robot cell 2 before the person enters.

Figure 6:
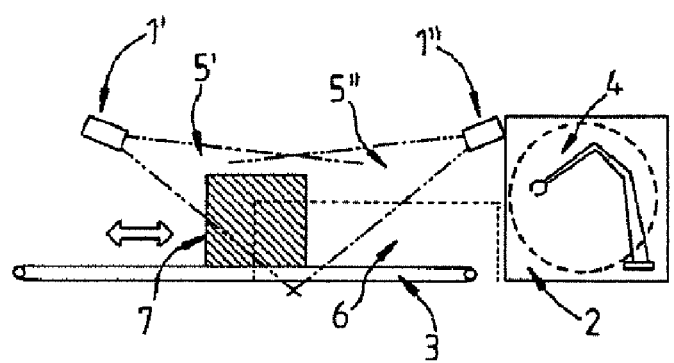
FIG. 6 shows a further embodiment of a robot cell with a conveying device and two monitoring cameras in a schematic side view.

FIG. 6 shows an embodiment in a side view that can appear in plan view just like the embodiments in accordance with FIGS. 3 to 5, in the case of which the two cameras 1', 1" cannot see. Monitoring fields 5', 5", which are also indicated in FIGS. 3, 4 and 5, indeed intersect one another, but the monitoring fields in each case do not include the other camera 1, 1".

This has the advantage that opposite cameras 1', 1" do not cause mutual disturbance when they are detecting because, for example, the respective illumination of the camera comes to be influenced. An adequate reliability of detection is thereby ensured for the respective camera.

Since, unlike in known embodiments, people are not detected by their shape or contour, but are detected by analyzing a speed distribution that can be determined with comparative ease with aid of a 3D camera, this results in a comparatively simple and reliable system. However, this is also due to the fact that in determining a speed distribution detection is not influenced by the clothing, hats or baggage that the person is wearing or carrying along.

The use of two cameras prevents "viewing shadows", and so it is reliably possible to prevent a person from entering the danger area of the robot or of the machine while hidden by an article.

LIST OF REFERENCE SYMBOLS 1 3D camera
1' 3D camera
1" 3D camera
2 Robot cell
2a Access area
2b Robot
3 Conveyor belt
4 Danger area
5 Field of view of the camera
5' Field of view of the camera
5" Field of view of the camera
6 Safety device
7 Article
7a Surface
8 Person
8a Leg
8b Leg
8c Arm
8d Arm

We claim:

1. A sensor device having a sensor arrangement for detecting moving objects, said device comprising a sensor and an electronic unit, wherein the sensor arrangement detects an object and subsequently investigates whether there are present within a surface of the object regions that move at least at one of a different speed and a different acceleration.

2. The sensor device of claim 1, wherein the sensor arrangement detects an object and subsequently investigates whether the object is accelerating.

3. The device of claim 1, wherein the sensor arrangement outputs a signal when it detects a difference in at least one of speed and acceleration of regions of the object that exceeds a predetermined value.

4. The device of claim 1, wherein the sensor arrangement determines an image of the object with distances from the object surface.

5. The device of claim 1, wherein the sensor arrangement intercompares distance images recorded by the sensor in order to find regions of an object surface that have at least one of different speeds and accelerations.

6. The device of claim 1, wherein the sensor arrangement determines distance differences from a comparison of distance images, and determines at least one of a speed image and an acceleration image of the object by reference to a time scale.

7. The device of claim 1, wherein a prescribed number of distance images are used iteratively by the sensor arrangement in order to determine at least one of a speed image and an acceleration image.

8. The device of claim 1, wherein the sensor comprises a single monitoring sensor.

9. The device of claim 8, wherein the monitoring sensor is a 3D camera.

10. The device of claim 1, wherein the sensor comprises a plurality of monitoring sensors.

11. The device of claim 10, wherein the plurality of monitoring sensors are arranged such that they have an overlapping observation region.

12. The device of claim 10, wherein the plurality of monitoring sensors are positioned in such a way that the sensors are not mutually visible.

13. The device of claim 10, wherein the monitoring sensors are arranged opposite with reference to a region to be monitored.

14. The device of claim 10, wherein the monitoring sensors operate at different detection frequencies.

15. The device of claim 10, wherein the monitoring sensors are active in different time intervals.

16. The device of claim 1, further comprising correction means to at least approximately compensate at least one of speed differences and acceleration differences of points on a known surface form, in particular in a plane at an object surface that moves in a customary movement direction relative to the sensor.

17. The device of claim 1, wherein the sensor arrangement qualifies regions having at least one of different speeds and different accelerations on an object surface with reference to known speed patterns and acceleration patterns, respectively.

18. The device of claim 1, wherein the sensor arrangement identifies objects.

19. The device of claim 1, wherein the sensor arrangement detects at least one of speed patterns and acceleration patterns based on at least one learning run.

20. The device of claim 1, wherein the sensor arrangement shields at least one prescribable subregion of the detection region in order to determine signals.

21. The device of claim 1, wherein the sensor arrangement outputs a signal, the type of which is dependent on at least one of the position, the distance from the camera, the movement direction, the speed and the acceleration of the object.

22. A system having a conveying device for transporting an object and a sensor device as claimed in claim 1.

23. The system of claim 22, wherein the conveying device causes a nonuniform movement of the object.

* * * * *